that they are bent inwardly. Numerals 9, 9 are stoppers which prevent the elastic clasping member 2 from slipping off the cell receiving space 1. Numeral 11 refers to an end portion of the cell receiving space 1, which is bent toward the cell 3 so as to clasp the cell 3, as shown in FIG. 2, jointly with the elastic clasping member 2 fitted thereinto.

United States Patent
Mabuchi

[11] 3,977,758  
[45] Aug. 31, 1976

[54] CELL HOLDING DEVICE  
[75] Inventor: Kenichi Mabuchi, Tokyo, Japan  
[73] Assignee: Mabuchi Motor Co. Ltd., Tokyo, Japan  
[22] Filed: May 23, 1974  
[21] Appl. No.: 472,519

[30] Foreign Application Priority Data  
June 1, 1973 Japan............................. 48-62138  
June 1, 1973 Japan...................... 48-65253[U]

[52] U.S. Cl.................................. 339/224; 46/251  
[51] Int. Cl.² ................ A63H 29/22; H01R 13/24  
[58] Field of Search ... 339/224; 46/243 M, 243 LV, 46/243 E, 230, 247; 136/166, 171

[56] References Cited  
UNITED STATES PATENTS  
3,818,632  6/1974  Tong .............................. 46/243 LV FOREIGN PATENTS OR APPLICATIONS  
6,413,629  8/1965  Netherlands ..................... 46/243 M Primary Examiner—Roy Lake  
Assistant Examiner—E. F. Desmond

[57] ABSTRACT

A device for holding an electric cell is disclosed which comprises a cell receiving space with its edges spaced enough to receive a cell and an elastic clasping member adapted to clasp the cell, the arrangement being such that the cell may be held by fitting the elastic clasping member into the cell receiving space and may be removed by pulling up the elastic clasping member, whereas the electric circuit may be completed by the fitting of the elastic clasping member without using any special lead-in wires.

5 Claims, 6 Drawing Figures

CELL HOLDING DEVICE

BACKGROUND OF THE INVENTION

1. FIELD OF THE INVENTION

This invention relates to a device for holding an electric cell and, more particularly, to a cell holding device in which the cell is held by fitting an elastic clasping member which clasps the cell into a cell receiving space and in which the electric circuit is completed when the cell is in its held condition.

2. DESCRIPTION OF THE PRIOR ART

When an electric cell is to be mounted in a cell receiving space, it is generally necessary not only to keep good electrical contact but also to prevent the cell from slipping off due to some vibration or shock, as well as at the same time to have it readily detachable. Thus, there have so far been adopted means to facilitate the removal of the cell such as by placing a ribbon under the cell before hand in the cell receiving space, but a cell holding device capable of mounting and removing the cell by a simpler operation is desirable.

In electrically driven toys it is desirable to have an arrangement which needs no such process as soldering of the lead-in wires to complete the electric circuit with a view to reducing the production cost and simplifying the manufacturing procedures. Moreover, it is desirable to have an arrangement which eliminates the chance for the young to mount the cell with the wrong polarity.

SUMMARY OF THE INVENTION

This invention has as its main object the provision of a cell holding device which can solve the various problems mentioned above.

It is another object of the invention to provide a cell holding device in which the cell is clasped in an elastic clasping member and is held firmly simply by pushing the elastic clasping member into the cell receiving space. It is a further object of the invention to provide a cell holding device in which the cell may readily be removed by simply pulling up the elastic clasping member which has been fitted in the cell receiving space. It is another object of the invention to provide a cell holding device in which the electric circuit can be completed without any lead-in wires but merely by fitting the elastic clasping member clasping the cell into the cell receiving space. It is yet another object of the invention to provide a cell holding device with means to prevent mounting of the cell with a wrong polarity. Other advantages of the invention will be apparent from the following descriptions made with reference to the attached drawings.

DETAILED DESCRIPTION OF THE EMBODIMENT

Figure 1:
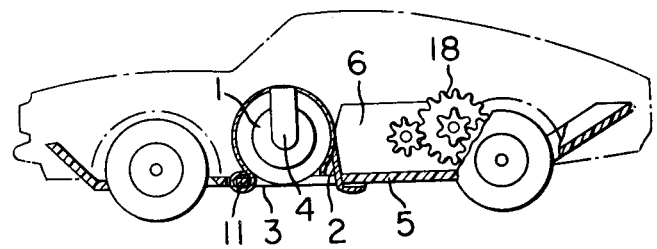
FIGS. 1 and 2 are cross-sectional views, respectively, of an embodiment of the invention in which the cell is mounted in a toy automobile.
Figure 2:
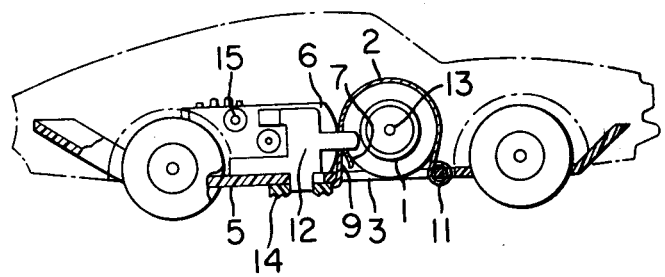

In FIGS. 1 and 2, the numeral 1 shows an electric cell, which, after having been set in an elastic clasping member 2, is fitted inside an opening referred to as the cell receiving space 3 in the chassis 5 of a toy car. In this condition, the negative electrode of the cell 1 is in electrical contact with a tongue 4 of the elastic clasping member 2 made of electrically conducting material, while said elastic clasping member 2 is in electrical contact with the casing or housing of the drive motor 6. The positive electrode (not shown) of the cell 1 is arranged to be connected through a conductor plate 12 forming a slide switch to the plus terminal 17 (FIG. 3) of the drive motor 6.

Figure 3:
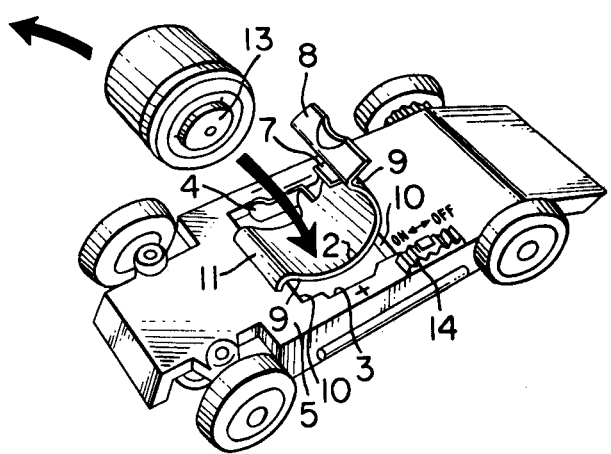
FIG. 3 is a perspective view of the underside of the toy automobile showing the relation between the elastic cell clasping member and the cell receiving space.

The elastic clasping member 2 for clasping the cell 1 is formed of such material as, for example, a phosphor bronze plate and is curved circularly in the case of the embodiment, as clearly seen in FIG. 3 which shows a perspective view seen from the underside of chassis 5. The elastic clasping member is provided with the tongue 4 at its side to contact electrically with the negative electrode the cell 1. The elastic clasping member 2 has a gripping piece 7 for ensuring the clasping of the cell 1 and is provided with a wing portion 8 as well as engaging portion 9 to engage the edges of the cell receiving space 3. The opening of the cell receiving space 3 has margins or edges 10 with such a spacing therebetween as to catch the engaging portion 9 of said elastic clasping member 2; that is, the spacing between the engaging portion 9 when the elastic clasping member is not subjected to any elastic deformation is chosen to be a little greater than the spacing between the edge 10 of the cell receiving space 3. Thus, when the elastic clasping member 2 is fitted into the cell receiving space 3, said engaging portion 9 will be pushed by the edge 10 so that the clasping member 2 will elastically deform to grip the cell 1 and prevent its accidental slippage.

Figure 4:
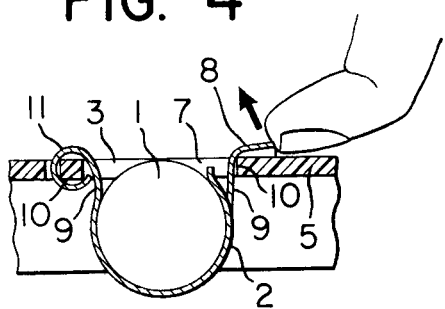
FIG. 4 is a detailed cross-sectional view of the cell in mounted position.
Figure 5:
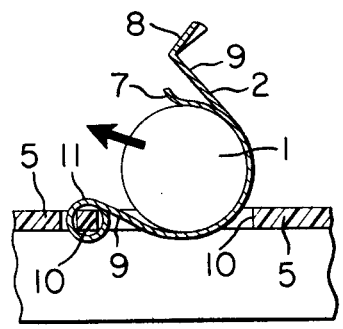
FIG. 5 is a cross-sectional detailed view of the cell being removed.

FIG. 4 shows the cell 1 as it is now held, while FIG. 5 shows the cell 1 as it is being removed. In FIG. 4, the elastic clasping member 2 is caught at its engaging portion 9 by the edge 10 of the cell receiving space 3. Thus, the elastic clasping member 2 is swingably supported to an edge 10 of the cell receiving space 3 by means of a hinge 11. As seen in FIG. 3, the cell 1 is brought to be clasped in the elastic clasping member 2 and then, by pushing the wing portion 8, the clasping member 2 is bent as it slides over the edge 10 of the cell receiving space so that the engaging portion 9 of the elastic clasping member will be pushed toward each other by the edge 10 thereby preventing any possible slippage of the cell.

When it is desired to remove the cell 1, the wing portion 8 is pulled up with a finger action on a portion of the wing part 8, as shown in FIG. 4. Then the elastic clasping member 2 is drawn out as it slides over the edge 10, as shown in FIG. 5. It is thus possible to take the cell 1 away from the gripping piece 7. Also in accordance with the invention, consideration is given to the shape of the opening of the cell receiving space in order to avoid error in polarity in mounting of the cell. Thus, the opening of the cell receiving space 3 is so shaped as to agree with the slight convex shape of the positive electrode 13 of the cell 1 in case the cell 1 is set in the right polarity as shown in FIG. 3. Accordingly, if the cell is set with the wrong polarity, the elastic clasping member 2 cannot fit into the opening even though it is pressed inward, because said shape of the opening prevents the passage of the negative side of the cell 1.

It should be noted that, although in the above embodiment the cell receiving space 3 has been represented by an opening provided in the chassis, the invention is not limited thereto but the cell receiving space has only to have a recess big enough to accommodate the elastic clasping member 2.

Figure 6:
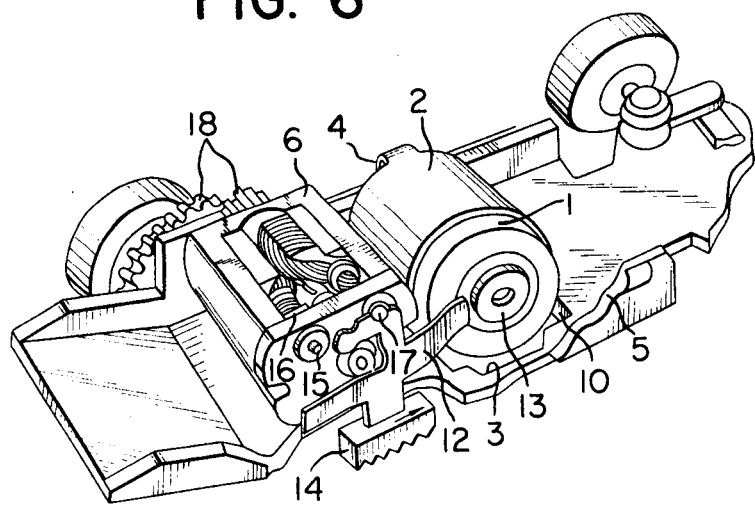
FIG. 6 is a perspective view of a toy automobile with details of the switch, with the body of the toy automobile removed.

Now, the completion of the electric circuit without any wiring concurrently with the elastic clasping member clasping of the cell will be described, with reference to FIG. 6. FIG. 6 is a perspective view showing the relation between the drive motor 6 and the cell 1 held by the clasping member 2. As the clasping member 2 holding the cell is pushed into the cell receiving space 3, the clasping member 2 slides over the surface of the case for the motor 6 and, as can be clearly seen in FIG. 1 or FIG. 2, the clasping member 2 comes into electrical contact with the case surface of the drive motor 6.

The drive motor 6 is provided with winding terminals 15, 17. One terminal 15 is welded to the case surface of the motor 6 via a ground plate 16. Therefore, when the clasping member 2 has fitted into the cell receiving space 3, the negative electrode of the cell 1 is connected to the clasping member 2 through the tongue 4, and further to the winding terminal 15 via the case surface of the motor 6 and the ground plate 16.

On the other hand, there is a switch means having a conductor plate 12 between the positive electrode 13 of the mounted cell and the winding terminal 17 of the motor. The switch means comprises a slider 14 together with said conductor plate 12. When the slider 14 is moved fully to the right as shown by the arrow in the Figure, the conductor plate 12 shortcircuits between the motor winding terminal 17 and the cell positive electrode 13 thereby to energizing the motor 6. When the slider 14 is moved back to the position shown in FIG. 6, the tip of the conductor plate 12 is out of contact with the positive electrode 13 of the cell thereby opening the electric circuit.

The numeral 18 shows gears for driving a wheel of the toy car.

It is understood from the foregoing description that, in accordance with the embodiment, the mounting of cell 1 may be achieved merely by inserting it in the electrically conductive elastic clasping member 2 as shown in FIG. 3 and then pushing such clasping member 2 into the opening of the cell receiving space 3, whereupon the clasping member 2 comes into contact with the case surface of the motor 6 while the switch means with its conductor plate 12 closes the circuit between the winding terminal 17 and the cell positive electrode. With such an arrangement, no wiring is necessary and the cell may be readily removed merely by drawing out the clasping member 2 as shown in FIG. 3 or FIG. 5.

Furthermore, the opening of the cell receiving space 3 is designed to have such a shape as to conform to the positive electrode side of the cell 1 in order to prevent it from being mounted with the wrong polarity. Therefore, even if one tries to mount the cell with the inverted polarity, the clasping member 2 will never fit into the opening, so that a wrong-polarity mounting may be avoided.

Numerous changes may be made in the above described cell holding device, and different embodiments of the present invention may be made without departing from the scope thereof. Therefore, it is intended that all matter contained in the foregoing description and in the accompanying drawings be interpreted as illustrative of the invention and not in a limiting sense.

I claim:

1. A device for holding an electric cell, comprising a cell receiving space having an opening large enough to receive the cell and having spaced opposite edges, and an elastic clasping member adapted to clasp the cell, said elastic clasping member having engaging portions to engage said edges of the cell receiving space, the spacing between one of the engaging portions arranged to contact one of the edges of the cell receiving space and the other of the engaging portions arranged to contact the other of the edges, being, when no elastic deformation exists, greater than the spacing between said edges of the cell receiving space, one end of said elastic clasping member being swingably secured to one of the said edges of the cell receiving space and the other end of the same being adapted to engage the other of the said edges of the cell receiving space, said other end of said elastic clasping member including a wing portion arranged to engage said other edge of the cell receiving space, said elastic clasping member being in electrical contact with one electrode of the cell which it clasps, said elastic clasping member being further adapted to be in electrical contact, when it has been fitted in the cell receiving space, with one electrical terminal of a driving motor.

2. A cell holding device as claimed in claim 1, further comprising switch means electrically connecting the other electrode of the clasped cell and the other electrical terminal of said driving motor.

3. A cell holding device as claimed in claim 2, in which said switch means comprises an electrically conductive plate having a length sufficient to span the distance between said other electrode of the cell and said other electrical terminal of the driving motor.

4. A cell holding device as claimed in claim 1, in which said elastic clasping member is made of an electrically conductive material.

5. A device for holding an electric cell in a space formed to accommodate the positive electrode terminal of the cell, said device comprising an elongated, arcuate portion having a first longitudinally extending edge that is adapted to be hingedly secured to one edge of the space in which the cell is received and a second longitudinally extending edge that is opposed to said first longitudinally extending edge and arranged to releasably engage the opposed edge of the space in which the cell is received, said device further comprising a resilient tab formed integrally with said arcuate portion for gripping and urging the cell against said arcuate portion and an electrically conductive tongue formed integrally with said arcuate portion and arranged to contact one of the terminals of the cell.

* * * * *